(12) United States Patent
Takada et al.

(10) Patent No.: US 12,443,892 B2
(45) Date of Patent: Oct. 14, 2025

(54) INFORMATION PROCESSING DEVICE, INFORMATION PROCESSING METHOD, AND COMPUTER PROGRAM PRODUCT FOR ESTIMATING PARAMETER OF MODEL FOR SPECIFIED TIME PARAMETER

(71) Applicant: KABUSHIKI KAISHA TOSHIBA, Tokyo (JP)

(72) Inventors: Masaaki Takada, Abiko (JP); Gen Li, Ota (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 906 days.

(21) Appl. No.: 17/652,123

(22) Filed: Feb. 23, 2022

(65) Prior Publication Data

US 2022/0391777 A1 Dec. 8, 2022

(30) Foreign Application Priority Data

May 31, 2021 (JP) .................................. 2021-091198

(51) Int. Cl.
*G06N 3/04* (2023.01)
*G06F 18/20* (2023.01)
(Continued)

(52) U.S. Cl.
CPC ....... *G06N 20/20* (2019.01); *G06F 18/21345* (2023.01); *G06F 18/285* (2023.01); *G06N 3/045* (2023.01)

(58) Field of Classification Search
CPC .............................. G06N 3/045; G06N 20/20
See application file for complete search history.

(56) References Cited

U.S. PATENT DOCUMENTS 10,453,026 B2  10/2019  Ray et al.
2020/0379533 A1 12/2020 Suzuki et al.
(Continued)

FOREIGN PATENT DOCUMENTS

JP  2008-8772 A   1/2008
JP  6299172 B2   3/2018
(Continued)

OTHER PUBLICATIONS

Bernas, Marcin, and Bartłomiej Płaczek. "Period-aware local modelling and data selection for time series prediction." Expert Systems with Applications 59 (2016): 60-77. (Year: 2016).*

(Continued)

*Primary Examiner* — Hal Schnee
(74) *Attorney, Agent, or Firm* — Oblon, McClelland, Maier &Neustadt, L.L.P.

(57) ABSTRACT

According to an embodiment, an information processing device includes processors. The processors receive input of a plurality of pieces of input data obtained during K time periods. K is an integer equal to or greater than two. The processors estimate K first models. Each of the K first models receives input of input data and outputs output data. Each of the K first models is estimated for each period of the K time periods, using a plurality of pieces of input data obtained during the each period. The processors estimate a second model that indicates a relationship between first time parameters related to times of the K time periods, and the K first models. The processors estimate a first model corresponding to a specified second time parameter, based on the estimated second model.

13 Claims, 8 Drawing Sheets

(51) Int. Cl.
  G06F 18/2134   (2023.01)
  G06N 3/045    (2023.01)
  G06N 20/20    (2019.01)

(56) References Cited

U.S. PATENT DOCUMENTS

| | | | | |
|---|---|---|---|---|
| 2022/0012641 | A1* | 1/2022 | Iyengar | G06N 20/20 |
| 2022/0036387 | A1* | 2/2022 | Papadimitriou | G06N 20/20 |
| 2022/0164676 | A1* | 5/2022 | McAlister | G06N 5/01 |
| 2022/0342861 | A1* | 10/2022 | Gonzalez Macias | G06F 16/24568 |

FOREIGN PATENT DOCUMENTS

| | | |
|---|---|---|
| JP | 2019-79120 A | 5/2019 |
| JP | 2020-194377 A | 12/2020 |

OTHER PUBLICATIONS

Okuno et al., "Extrapolation Towards Imaginary 0-Nearest Neighbour and Its Improved Convergence Rate", 34$^{th}$ Conference on Neural Information Processing Systems (NeurIPS 2020), Vancouver, Canada, 2020, 31 Pages.

Takada et al., "Transfer Learning via & Regularization", 34$^{th}$ Conference on Neural Information Processing Systems (NeurIPS 2020), Vancouver, Canada, 2020, 23 Pages.

Casas et al., "tvReg: Time-varying Coefficient Linear Regression for Single and Multi-Equations in R", 2019, 43 Pages.

Japanese Office Action issued May 7, 2024 in Japanese Application 2021-091198 (with English Translation), 3 pages.

Iwata, T. et al., "Model Learning when Distributions Differ over Time", The IEICE Transactions on Information and Systems (Japanese Edition), The Institute of Electronics, Information and Communication Engineers, Mar. 1, 2009, vol. J92-D, No. 3, 24 pages, (with English translation).

* cited by examiner

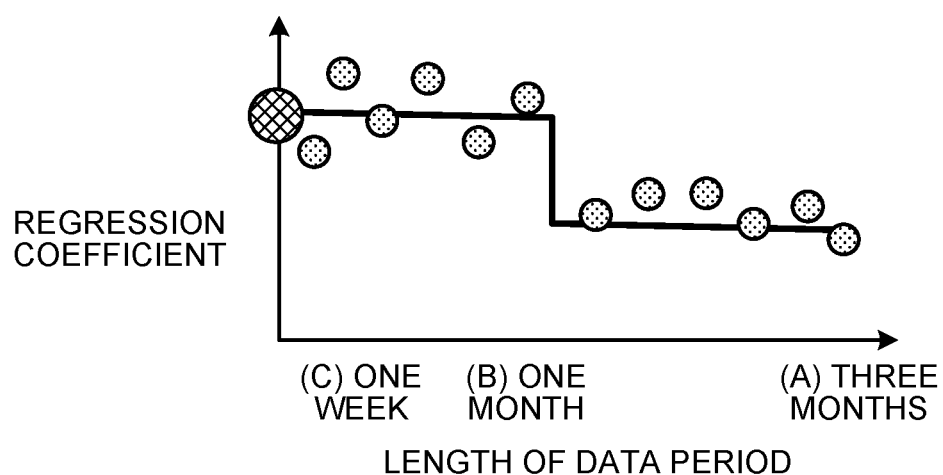
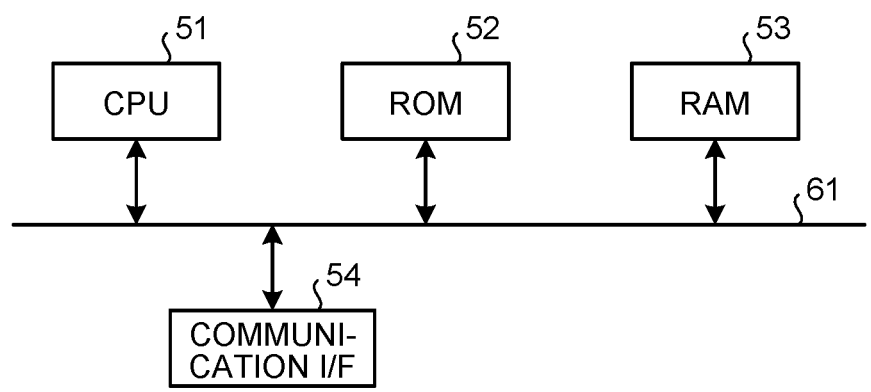

INFORMATION PROCESSING DEVICE, INFORMATION PROCESSING METHOD, AND COMPUTER PROGRAM PRODUCT FOR ESTIMATING PARAMETER OF MODEL FOR SPECIFIED TIME PARAMETER

CROSS-REFERENCE TO RELATED APPLICATIONS

This application is based upon and claims the benefit of priority from Japanese Patent Application No. 2021-091198, filed on May 31, 2021; the entire contents of which are incorporated herein by reference.

FIELD

Embodiments described herein relate generally to an information processing device, an information processing method, and a computer program product.

BACKGROUND

For example, in a semiconductor factory or in a chemical plant, in order to enhance the productivity, the yield, and the reliability; efforts are taken on a daily basis for monitoring the quality characteristics so as to capture the changes in the trend and to reduce the dispersion of quality. In order to reduce such dispersion, it is necessary to accurately understand the factors causing that dispersion. For that purpose, a model is used in which statistics and machine learning is implemented (such as a regression model or a classification model). The explanatory variables of the model are set as the process data such as sensor values, control values, and setting values; and the objective variables are set as the quality characteristics. With that, it becomes possible to analyze the factors causing dispersion in the quality characteristics.

In order to perform the analysis with accuracy, it becomes necessary to estimate a more accurate (a high-precision) model. The model estimation is performed using the data of a certain period of time in the past. If that period of time (hereinafter, called a data period) is too short, then it may result in data deficiency because of which an accurate model cannot be estimated. On the other hand, if the data period is too long, then there are times when the latest trend cannot be captured using the estimated model.

BRIEF DESCRIPTION OF THE DRAWINGS

FIG. 8 is a diagram illustrating the outline of an operation for estimating a regression model according to the second embodiment; and FIG. 9 is a hardware configuration diagram of the information processing devices according to the first and second embodiments.

DETAILED DESCRIPTION

Figure 1:
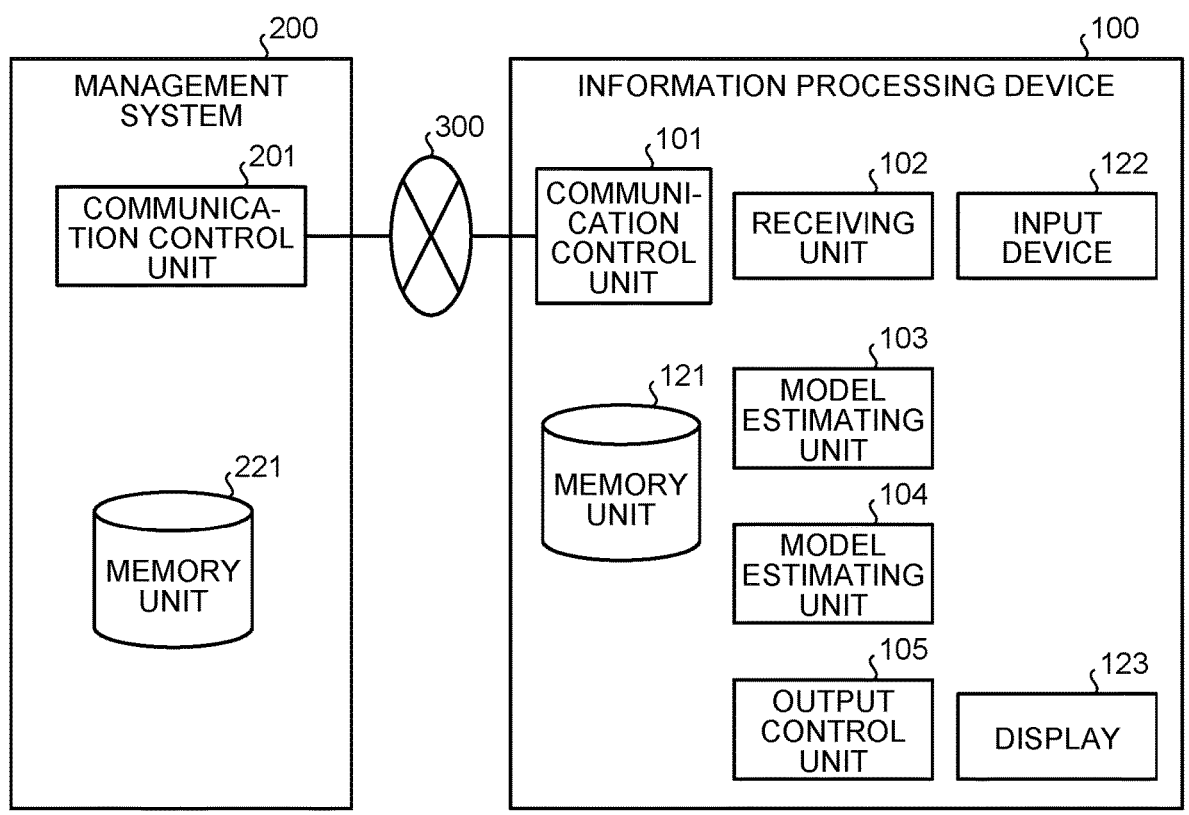
FIG. 1 is a block diagram of an information processing system according to a first embodiment.

According to an embodiment, an information processing device includes processors. The processors receive input of a plurality of pieces of input data obtained during K time periods. K is an integer equal to or greater than two. The processors estimate K first models. Each of the K first models receives input of input data and outputs output data. Each of the K first models is estimated for each period of the K time periods, using a plurality of pieces of input data obtained during the each period. The processors estimate a second model that indicates a relationship between first time parameters related to times of the K time periods, and the K first models. The processors estimate a first model corresponding to a specified second time parameter, based on the estimated second model.

Preferred embodiments of an information processing device according to the present invention are described below in detail with reference to the accompanying drawings.

As explained above, in the conventional technology, unless the data period is appropriately set, there are times when a model having a higher degree of accuracy cannot be estimated. Particularly, in a semiconductor factory or in a chemical plant, the data trend varies with each passing moment (non-stationarity), and the behavior of data has poor periodicity in regard to days or seasons (aperiodicity). For that reason, if the data period is too long, then the data trend becomes dull; and a model in which the recent trend is appropriately reflected cannot be estimated. Usually, the length of the data period is set by taking into account the balance of such factors.

Another method has been proposed in which, instead of setting the length of the data period, a weight is assigned according to the length of the time period from the present to the point of time when obtaining the data; and a model (a time-varying coefficient model or a variation coefficient model) is estimated accordingly. According to that method, for example, the objective function is designed in such a way that the recent data is assigned with a large weight and the data in the distant past is assigned with a small weight; so that it becomes possible to estimate a model capable of capturing the newer trend.

However, in the methods explained above, there is a problem that "the current trend cannot be captured". That is, even if the data period is appropriately set, it is possible to capture the trend only during the data period in which the data is obtained. Hence, it is not possible to accurately capture the trend at, for example, the points of time on which the data is absent or the points of time on which only an extremely small volume of data is obtained.

In that regard, in the embodiments described below, a method is implemented for estimating a model capable of performing a more accurate analysis also with respect to the points of time, data on which is insufficient, such as the current point of time.

First Embodiment

In an information processing device according to a first embodiment, (builds) a plurality of models is estimated by varying the data period in various ways, and the changes in the time axis direction of a plurality of models are also modeled; and a model is estimated that is capable of analyzing, with a higher degree of accuracy, the trend at the points of time on which data is insufficient. As a result, for example, it becomes possible to promptly detect a sudden change in the trend of the data.

FIG. 1 is a block diagram illustrating an exemplary configuration of an information processing system that includes the information processing device according to the first embodiment. As illustrated in FIG. 1, in the information processing system; an information processing device 100 and a management system 200 are connected to each other via a network 300.

The information processing device 100 as well as the management system 200 can be configured as, for example, a server device. The information processing device 100 and the management system 200 can be implemented as a plurality of physically-independent devices (systems). Alternatively, the functions of the information processing device 100 and the management system 200 can be provided in a single physical device. In the latter case, the network 300 need not be included. Still alternatively, at least either the information processing device 100 or the management system 200 can be built in a cloud environment.

The network 300 is, for example, a local area network (LAN) or the Internet. Moreover, the network 300 either can be a wired network or can be a wireless network. Meanwhile, instead of involving the network 300, the information processing device 100 and the management system 200 can send and receive data using a direct wired connection or a direct wireless connection established among the components.

The management system 200 is a system for managing the models processed by the information processing device 100, and for managing the data used in the learning (estimation) and the analysis of models. The management system 200 includes a memory unit 221 and a communication control unit 201.

The memory unit 221 is used to store a variety of information used in various operations performed in the management system 200. For example, the memory unit 221 is used to store the input data to be used in the estimation of models. The memory unit 221 can be configured using any commonly-used memory medium such as a flash memory, a memory card, a random access memory (RAM), a hard disk drive (HDD), or an optical disk.

A model receives explanatory variables as input, and outputs the inference about the objective variables. Examples of a model include a linear regression model, a polynomial regression model, a logistic regression model, a Poisson regression model, a generalized liner model, a generalized additive model, and a neural network model. However, a model is not limited to those examples, and any model can be used as long it is expressed using parameters.

A model is estimated as a result of performing learning with the use of input data that contains objective variables and explanatory variables. The objective variables represent, for example, information indicating the quality characteristics, the percent defective, and the non-defective items/defective items. The explanatory variables represent other sensor values, setting values such as processing conditions, and control values.

The communication control unit 201 controls the communication performed with external devices such as the information processing device 100. For example, the communication control unit 201 sends the input data to the information processing device 100.

The constituent element explained above (the communication control unit 201) is implemented using, for example, one or more processors. For example, the constituent element explained above can be implemented by making a processor such as a central processing unit (CPU) execute a computer program, that is, can be implemented using software. Alternatively, the constituent element explained above can be implemented using a dedicated processor such as an integrated circuit (IC), that is, can be implemented using hardware. Still alternatively, the constituent element explained above can be implemented using a combination of software and hardware. In the case of using a plurality of processors, each processor either can implement a single constituent element or can implement two or more constituent elements.

The information processing device 100 includes a memory unit 121, an input device 122, a display 123, a communication control unit 101, a receiving unit 102, a model estimating unit 103 (a first model estimating unit), a model estimating unit 104 (a second model estimating unit), and an output control unit 105.

The memory unit 121 is used to store a variety of information used in various operations performed in the information processing device 100. For example, the memory unit 121 is used to store the following: the information (such as input data) obtained from the management system 200 via the communication control unit 101 and the receiving unit 102; the parameters of the models estimated by the model estimating unit 103; and the parameters of the models estimated by the model estimating unit 104. The memory unit 121 can be configured using any commonly-used memory medium such as a flash memory, a memory card, a RAM, an HDD, or an optical disk.

The input device 122 is a device for enabling the user to input information. Examples of the input device 122 include a keyboard and a mouse. The display 123 represents an example of an output device for outputting information. Examples of the display 123 include a liquid crystal display. Meanwhile, the input device 122 and the display 123 can alternatively be integrated as a touch-sensitive panel.

The communication control unit 101 controls the communication performed with external devices such as the management system 200. For example, the communication control unit 101 receives the input data from the management system 200.

The receiving unit 102 receives input of a variety of information. For example, the receiving unit 102 receives a plurality of pieces of input data from the management system 200 via the communication control units 201 and 101. For example, the plurality of pieces of data are obtained during K data periods (where K is an integer equal to or greater than two) in which the time parameter related to the time (first time parameters) is mutually different. The time parameter indicates, for example, either the length of the corresponding data period, or the start time point (the start point) of the corresponding data period, or the end time point (the end point) of the corresponding data period.

The data periods can be set in advance, or can be specified by the user. Alternatively, the data periods can be decided based on the degree of accuracy of the model estimated by the model estimating unit 103.

The receiving unit 102 requests, for example, the management system 200 for the transmission performed during the specified (decided) data period, and receives the input data sent from the management system 200 in response to the request. Herein, the configuration can be such that the receiving unit 102 or the model estimating unit 103 can extract the input data corresponding to the specified data period, from among a plurality of pieces of input data received from the management system 200.

The model estimating unit 103 estimates a plurality of models using a plurality of pieces of input data. For example, for each of the K data periods, the model estimating unit 103 uses a plurality of pieces of input data obtained during that data period and estimates a model (a first model) that receives the input data as input and outputs output data.

The model estimating unit 104 uses the K models estimated by the model estimating unit 103, and estimates a different model (a second model) that is meant for estimating a model corresponding to the specified time parameter. For example, the model estimating unit 104 estimates a model indicating the relationship between the time parameter and the K already-estimated models; and then, based on that estimated model, estimates a model corresponding to the specified time parameter (a second time parameter). Herein, the specified time parameter is, for example, the time point for model estimation (such as the current point of time).

The output control unit 105 controls the output of a variety of information processing performed in the information processing device 100. For example, in the display 123, the output control unit 105 displays the models estimated by the model estimating unit 103, and displays the model estimated by the model estimating unit 104.

The output control unit 105 can also output information to external devices of the information processing device 100. For example, the output control unit 105 can send the information meant for displaying the models to an external device equipped with a display device.

The constituent elements explained above (the communication control unit 101, the receiving unit 102, the model estimating unit 103, the model estimating unit 104, and the output control unit 105) are implemented using, for example, one or more processors. For example, the constituent elements explained above can be implemented by making a processor such as a CPU execute a computer program, that is, can be implemented using software. Alternatively, the constituent elements explained above can be implemented using a dedicated processor such as an IC, that is, can be implemented using hardware. Still alternatively, the constituent elements explained above can be implemented using a combination of software and hardware. In the case of using a plurality of processors, each processor either can implement one of the constituent elements or can implement two or more constituent elements.

Figure 2:
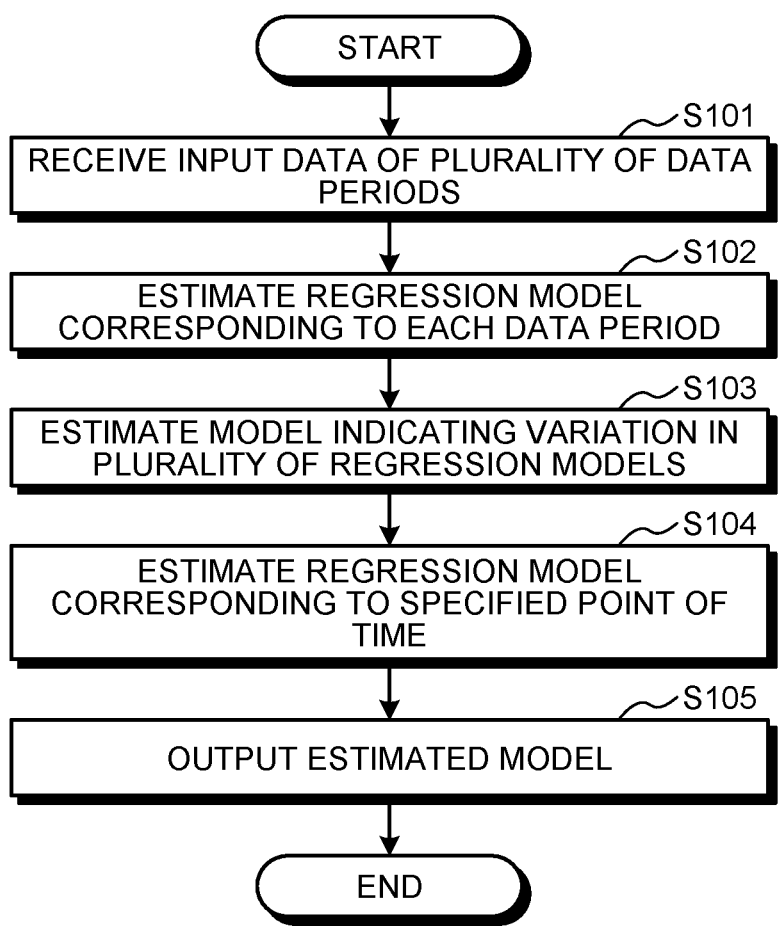
FIG. 2 is a flowchart for explaining an example of a model estimation operation performed according to the first embodiment.

Given below is the explanation of a model estimation operation performed in the information processing device 100 configured in the manner explained above according to the first embodiment. FIG. 2 is a flowchart for explaining an example of the model estimation operation performed according to the first embodiment.

The receiving unit 102 receives, from the management system 200, a plurality of pieces of input data corresponding to a plurality of data periods (Step S101). For each of those data periods, the model estimating unit 103 estimates a model using a plurality of pieces of input data obtained during that data period (Step S102). Herein, it is assumed that the model estimating unit 103 estimates a regression model for each data period.

Then, the model estimating unit 104 uses a plurality of regression models estimated corresponding to a plurality of data periods, and estimates a model indicating the time variation in those regression models (Step S103). Subsequently, using that estimated model, the model estimating unit 104 further estimates a regression model corresponding to the specified point of time (for example, the current point of time) (Step S104). The output control unit 105 displays the estimated regression model in, for example, the display 123 (Step S105). It marks the end of the model estimation operation.

Given below is the more detailed explanation about the model estimation operation. The following explanation is given mainly about an example of the model estimation operation for estimating a model to be applied for quality management in a factory (a semiconductor factor) and a plant (a chemical plant).

In a semiconductor factory and a chemical plant, it is required to hold down the dispersion and the fluctuation of the quality characteristics and to reduce defects, so as to enhance the yield. In order to figure out the factors causing the dispersion and the fluctuation in the quality characteristics, models such as regression models and classification models are used. Such models are estimated from the input data that contains the objective variables, the explanatory variables, and the dates.

As explained earlier, the objective variables represent information indicating the quality characteristics, the percent defective, and the non-defective items/defective items. The explanatory variables represent other sensor values, setting values, and control values. The dates indicate the manufacturing commencement date, the manufacturing completion date, and the processing dates in specific devices.

The explanatory variables can be subjected to preprocessing in advance. Examples of the preprocessing include standardization, normalization, conversion using specific functions, interaction term addition, time lagging, time reading, dummy parameterization, encoding, outlier processing, and missing-value processing.

Meanwhile, the input data is stored in the memory unit 221 of the management system 200. The receiving unit 102 receives input of the input data, which is received from the management system 200 via the communication control unit 101.

In the following explanation, n represents the number of pieces of input data (where n is an integer equal to or greater than one); and it is assumed that each piece of data contains the following: p explanatory variables x; a single objective variable y; and a single numerical value t indicating the date. Thus, the i-th piece of input data $(x_i, y_i, t_i)$ (where $1 \le i \le n$ holds true) is expressed using Equation (1) given below.

$$(x_i, y_i, t_i), x_i \in \mathbb{R}^p, y_i \in \mathbb{R}, t_i \in \mathbb{R}, i=1, \ldots, n \quad (1)$$

Herein, $x_i$ represents a p-dimensional vector indicating the explanatory variable; $y_i$ represents a scalar indicating the objective variable; and $t_i$ represents a scalar indicating the date. As the scalar $t_i$, the length of time (days, hours, minutes, or seconds) counted from a particular starting date can be used. Herein, in order to simplify the notation, it is assumed that $0=t_1 \le t_2 \le \ldots \le t_n = T$ holds true. Meanwhile, the date representing the start point can be decided in an arbitrary manner. Moreover, when the time points are not arranged in order, they can be sorted in advance.

The following explanation is given for an example in which a regression model corresponding to the current point of time (a time point T) is estimated. In a conventional method, the most recent input data is collected, and a regression model is estimated. For example, in the case of performing modeling using the least-square method using the pieces of input data from the $i_0$-th set onward (where $1 \leq i_0 \leq n$ holds true), a regression model is estimated by solving the optimization problem given below in Equation (2). Herein, $\hat{\beta}_0$ represents a one-dimensional vector, and $\hat{\beta}$ represents a p-dimensional vector. The symbol "^" represents the hat put on the upper part of the variable written on the right side (in this example, "β"). Moreover, in $\beta^T$, "T" represents transposition.

$$\hat{\beta}_0, \hat{\beta} = \operatorname{argmin}_{\beta_0, \beta} \sum_{i=i_0}^n (y_i - \beta_0 - \beta^T x_i)^2 \quad (2)$$

Using the regression model obtained according to the method explained above, although it becomes possible to understand the trend during the period of time from the time point $t\_i_0$, to the time point T; for example, the trend at the time point T cannot be estimated with more accuracy.

In that regard, in the first embodiment, a plurality of regression models is used that is estimated from the input data of a plurality of data periods. Firstly, the model estimating unit 103 takes the $i_1$-th piece of input data, the $i_2$-th piece of input data, . . . , the $i_K$-th piece of input data (where $1 \leq i_1 \leq i_2 \leq \ldots i_K \leq n$ holds true) as the K pieces of input data.

Subsequently, as given below in Equation (3), the model estimating unit 103 estimates K regression models in which the input data corresponding to the time point $t\_i_K$ to the time point T is used. In this example, it can be interpreted that the start time point of the data period (i.e., the time point $t\_i_K$) is used as the time parameter.

$$\hat{\beta}_0^{(k)}, \hat{\beta}^{(k)} = \operatorname{argmin}_{\beta_0, \beta} \sum_{i=i_k}^n (y_i - \beta_0 - \beta^T x_i)^2, k = 1, \ldots, K \quad (3)$$

As a result, a set including K regression models and the time point is obtained as $(\hat{\beta}_0^{(k)}, \hat{\beta}^{(k)}, t\_i_K)$, (where $k=1, \ldots, K$ holds true).

Subsequently, the model estimating unit 104 estimates another regression model indicating the relationship between $\hat{\beta}_{j(k)}$ (where $j=0, 1, \ldots, p$ holds true) and $t\_i_K$; and uses that regression model to obtain a regression model $\hat{\beta}_j$ corresponding to the case in which $t=T$ holds true. For example, with respect to $j=0, 1, \ldots, p$; the model estimating unit 104 solves the optimization problem given below in Equation (4), and obtains regression coefficients $\hat{\alpha}_{j0}$ and $\hat{\alpha}_{j1}$ of the regression model. Herein, $\hat{\alpha}_{j0}$ and $\hat{\alpha}_{j1}$ represent scalar values.

$$\hat{\alpha}_{j0}, \hat{\alpha}_{j1} = \operatorname{argmin}_{\alpha_0, \alpha_1} \sum_{k=1}^K \left(\hat{\beta}_j^{(k)} - \alpha_0 - \alpha_1 t_{i_k}\right)^2, \hat{\beta}_j = \hat{\alpha}_{j0} + \hat{\alpha}_{j1} T \quad (4)$$

In this way, after a plurality of regression models is estimated using the input data of a plurality of data periods; the time variation of the regression models is again modeled, and the prediction values of the regression coefficients at the current point of time are calculated. With that, the regression model corresponding to the current point of time can be estimated with a higher degree of accuracy.

Herein, Equation (4) is about the estimation method of the regression model corresponding to the time point T. As given below in Equation (5), also with respect to a time point T' that either arrives after the time point T or arrives before the time point T, a regression model can be estimated in an identical manner.

$$\hat{\beta}_j = \hat{\alpha}_0 + \hat{\alpha}_1 T' \quad (5)$$

The model estimation method is not limited to the method in which the least-square method is used as given earlier in Equation (3). Alternatively, any other method can be implemented. For example, it is also possible to use penalized regression such as Ridge, Lasso, SCAD (Smoothly Clipped Absolute Derivation), MCP (Minimax Concave Penalty), Lq norm (where $0 \leq q \leq 1$ holds true), Elastic Net, or L1/2 norm. It can be interpreted that such penalized regression is a method for estimating a model in such a way that the parameters of the model have sparsity.

Meanwhile, in the case of obtaining $\hat{\beta}_0^{(k)}$ and $\hat{\beta}^{(k)}$ using Equation (3), the model estimating unit 103 can use Transfer Lasso (Non Patent Literature 2) in which the regression model $\hat{\beta}^{(k)}$ in which the input data from the time point $t\_i_K$ to the time point T (a first period) is used, is used as the initial estimation amount (initial value), and transfer learning is performed into the regression model corresponding to the input data form the time point $t\_i_{K+1}$ to the time point T (a second period).

Meanwhile, the loss function is not limited to the square error, and any other type of function can be used. For example, any type of loss function, such as absolute value loss, quantile loss, Huber loss, epsilon sensitivity loss, logistic loss, index loss, hinge loss, or smoothing hinge loss, can be used if applicable in the model estimation method to be implemented.

Alternatively, the model estimating unit 103 can use a loss function that is weighted according to the degree of reliability and the date of each piece of input data.

Meanwhile, the model to be estimated is not limited to a linear regression model, and can alternatively be a polynomial regression model, a logistic regression model, a Poisson regression model, a generalized liner model, a generalized additive model, or a neural network model.

Meanwhile, although the time point T indicates the end point of the piece of input data (i.e., although the input data from the time point $t\_i_K$ to the time point T is used), it is also possible to use a different time point than the time point T as the end point of the input data.

Meanwhile, the model estimation method implemented by the model estimating unit 104 is also not limited to the least-square method given earlier in Equation (4); and it is possible to implement some other method in the same way as explained for the model estimation method implemented by the model estimating unit 103.

In the explanation given above, the regression coefficients $\hat{\alpha}_{j0}$ and $\hat{\alpha}_{j1}$ are obtained for each "j". Alternatively, the model estimating unit 104 can implement multitask learning in which each "j" is treated as a single task and all tasks are optimized in a simultaneous manner. Moreover, in order to stabilize the estimation of a model, the model estimating unit 104 can also use penalized regression such as Ridge, Lasso, SCAD, MCP, Lq norm (where $0 \leq q \leq 1$ holds true), Elastic Net, or L1/2 norm.

Meanwhile, instead of using Equation (4) given earlier, the model estimating unit 104 can perform modeling using a quadratic function as given below in Equation (6).

$$\hat{\alpha}_{j0}, \hat{\alpha}_{j1}, \hat{\alpha}_{j2} = \operatorname{argmin}_{\alpha_0, \alpha_1, \alpha_2} \sum_{k=1}^K \left(\hat{\beta}_j^{(k)} - \alpha_0 - \alpha_1 t_{i_k} - \alpha_2 t_{i_k}^2\right)^2, \quad (6)$$
$$\hat{\beta}_j = \hat{\alpha}_{j0} + \hat{\alpha}_{j1} T + \hat{\alpha}_{j2} T^2$$

For example, there are times when the user wishes to capture, at an early stage, the sensor items (the explanatory variables) that have started to create an adverse impact on the quality characteristics. For example, it is possible to think of a case in which the present manufacturing process is stable, and any slight decline in the quality is to be captured and dealt with at an early stage. At that time, if a linear regression model is used as the model for estimating the objective variables from the explanatory variables (a first model), then there is a possibility that the changes in the trend cannot be captured at an early stage. In that case, if modeling is implemented using a quadratic function as given above in Equation (6), it becomes possible to take into account the acceleration of the change in the trend, and the items having high urgency can be monitored without fail.

Figure 3:
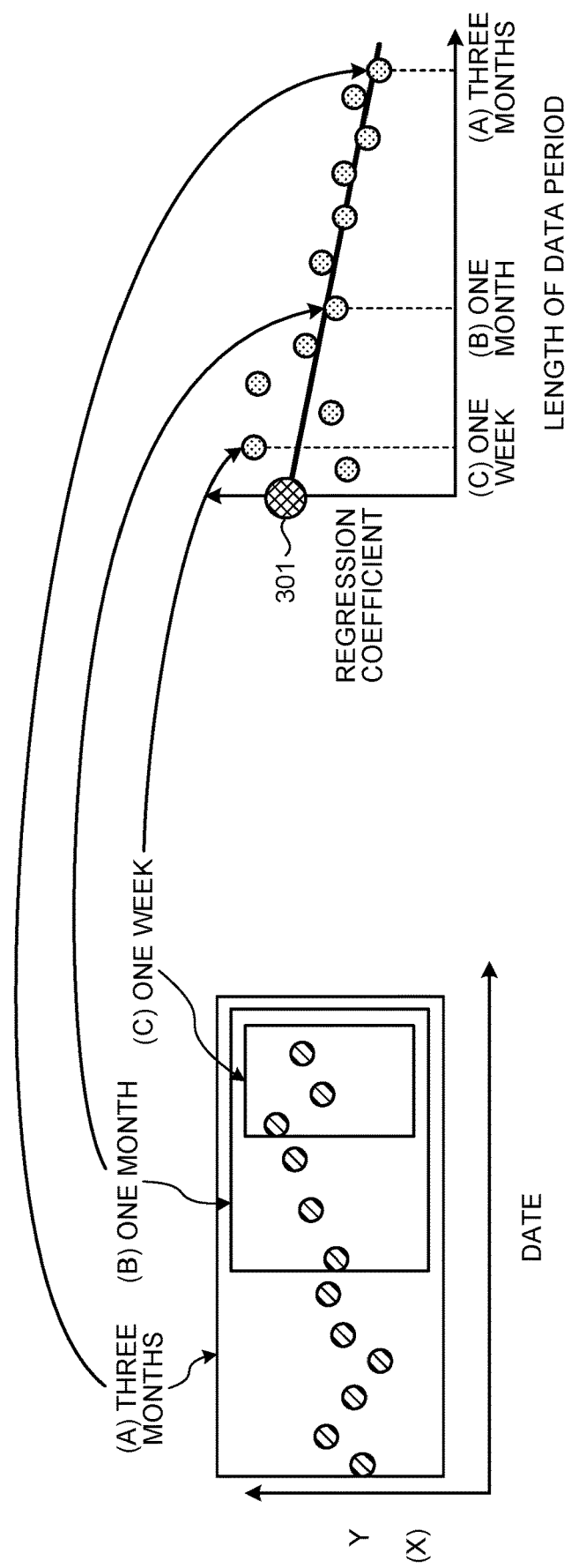
FIG. 3 is a diagram illustrating an example of model estimation performed using a linear regression model.

FIG. 3 is a diagram illustrating an example of model estimation performed using a linear regression model. In FIG. 3, the graph illustrated on the left side indicates that the input data of three different data periods given below is used. In this example, all data periods have the same end point set to the current point of time, but have mutually different start points. That is, in this example, the start points corresponds to mutually different time parameters. Meanwhile, in this example, it can be interpreted that the lengths of the time periods with reference to the same point of time (the end point) corresponds to the mutually different parameters.
  (A1) three months starting from three months ago to the current point of time
  (B1) one month starting from one month ago to the current point of time
  (C1) one week starting from one week ago to the current point of time In FIG. 3, the graph on the right side indicates the change in the regression coefficient corresponding to the length of each data period. Meanwhile, the regression coefficient is a vector, but for explanatory convenience, the changes illustrated in FIG. 3 are only for a single element. Moreover, in FIG. 3, the points representing the regression coefficients for other data periods, other than the data periods (A1), (B1), and (C1), are also illustrated.

In the graph on the right side, the straight line corresponds to, for example, the linear regression model estimated using Equation (4) (a second model). Thus, using such a linear regression model, the model estimating unit 104 can estimate, for example, a regression coefficient 301 corresponding to a time period 0 that corresponds to the time point T. That is, the model estimating unit 104 can estimate the regression model corresponding to the time point T (i.e., a first model). In that case, the point of time, the regression model at which is estimated, corresponds to the specified time parameter (a second time parameter). In the example illustrated in FIG. 3, the current point of time (the time point T) at which the length of the data period is "0" corresponds to the specified time parameter.

The time parameters are not limited to the example explained above. Alternatively, for example, the lengths (widths) of the time periods centered on a particular point of time can represent the mutually different time parameters. For example, three different data periods can be used as given below.
  (A2) three months centered on the point of time one and half months ago (i.e., from three months ago up to the current point of time)
  (B2) one month centered on the point of time one and half months ago (i.e., from two months ago up to one month ago)
  (C2) one week centered on the point of time one and half months ago Such data periods are suitable in the case of, for example, estimating a model for the point of time on which data is insufficient and that was one and half months ago from the current point of time.

Figure 4:
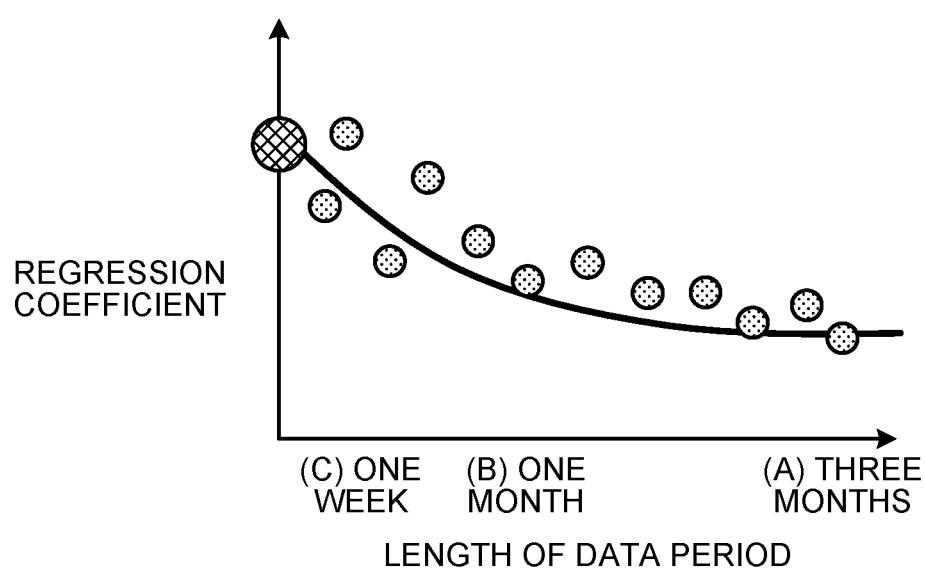
FIG. 4 is a diagram illustrating an example of model estimation performed using a quadratic function.

Still alternatively, for example, it is possible to use three different data periods as given below. In this example, the start points or the end points of the time periods having the same length correspond to the mutually different time parameters.
  (A3) one month starting from three months ago up to two months ago
  (B3) one month starting from two months ago up to one month ago
  (C3) one month starting from one month ago up to the current point of time FIG. 4 is a diagram illustrating an example of model estimation performed using, for example, a quadratic function as given in Equation (6). As explained above, a model in which a quadratic function is used enables taking into account the acceleration of the change in the trend, so that the trend of the change can be captured at a still earlier stage.

Figure 5:
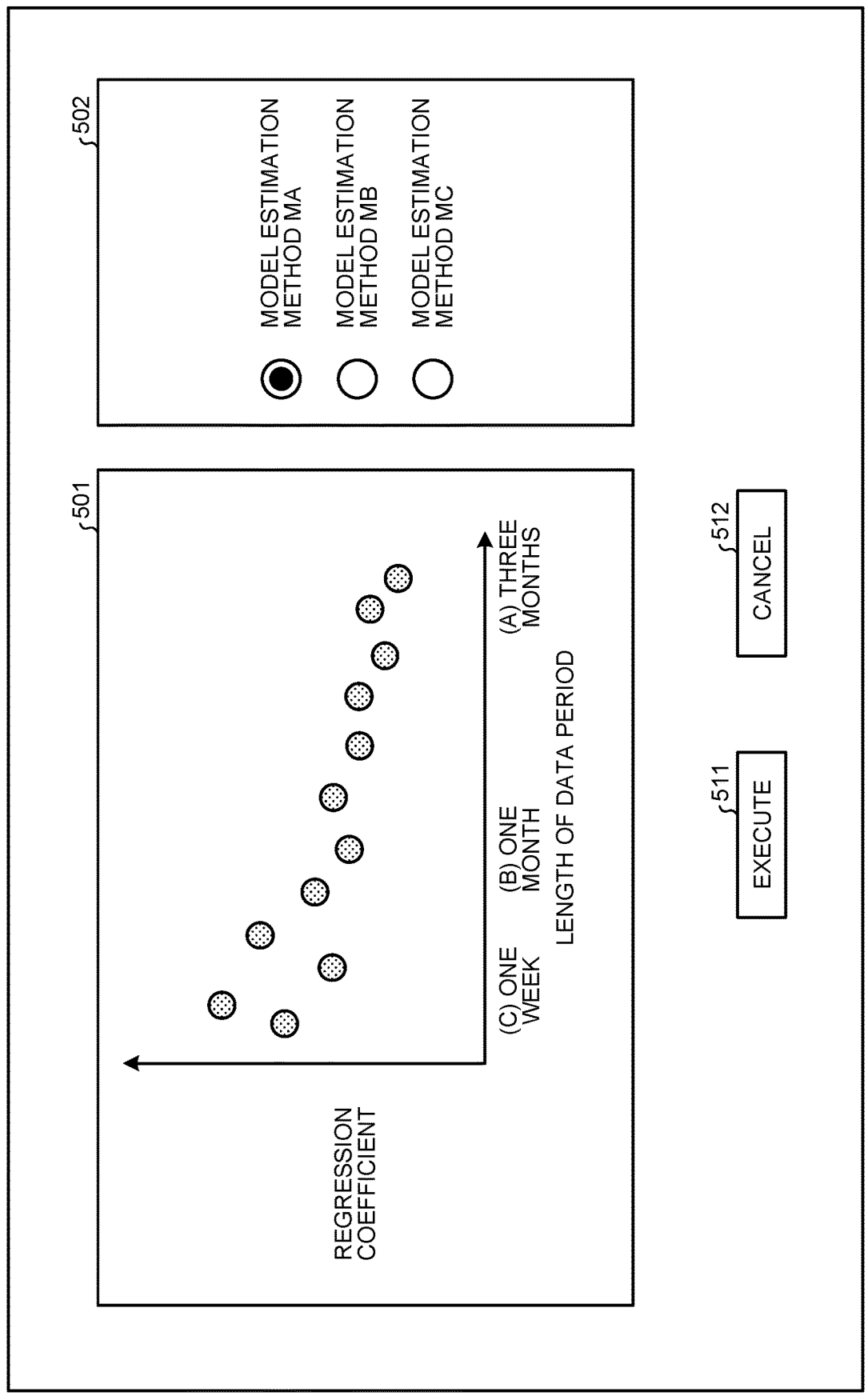
FIG. 5 is a diagram illustrating an example of a specification screen enabling specification of the model estimation method.

Meanwhile, for example, the user can be allowed to specify the model estimation method to be implemented by the model estimating unit 103 and to specify the model estimation method to be implemented by the model estimating unit 104. FIG. 5 is a diagram illustrating an example of a specification screen enabling specification of the model estimation method.

As illustrated in FIG. 5, the specification screen includes a model display field 501, a selection field 502, an execute button 511, and a cancel button 512. The model display field 501 is a region for displaying the model estimated by the model estimating unit 103. For example, the output control unit 105 displays, in the model display field 501, the model estimated by the model estimating unit 103.

The selection field 502 is a region for enabling the user to select (specify) a model estimation method. When the user selects a model estimation method and presses the execute button 511, the model estimating unit 104 estimates a model according to the selected model estimation method. Meanwhile, if the cancel button 512 is pressed, the processing is terminated.

Figure 6:
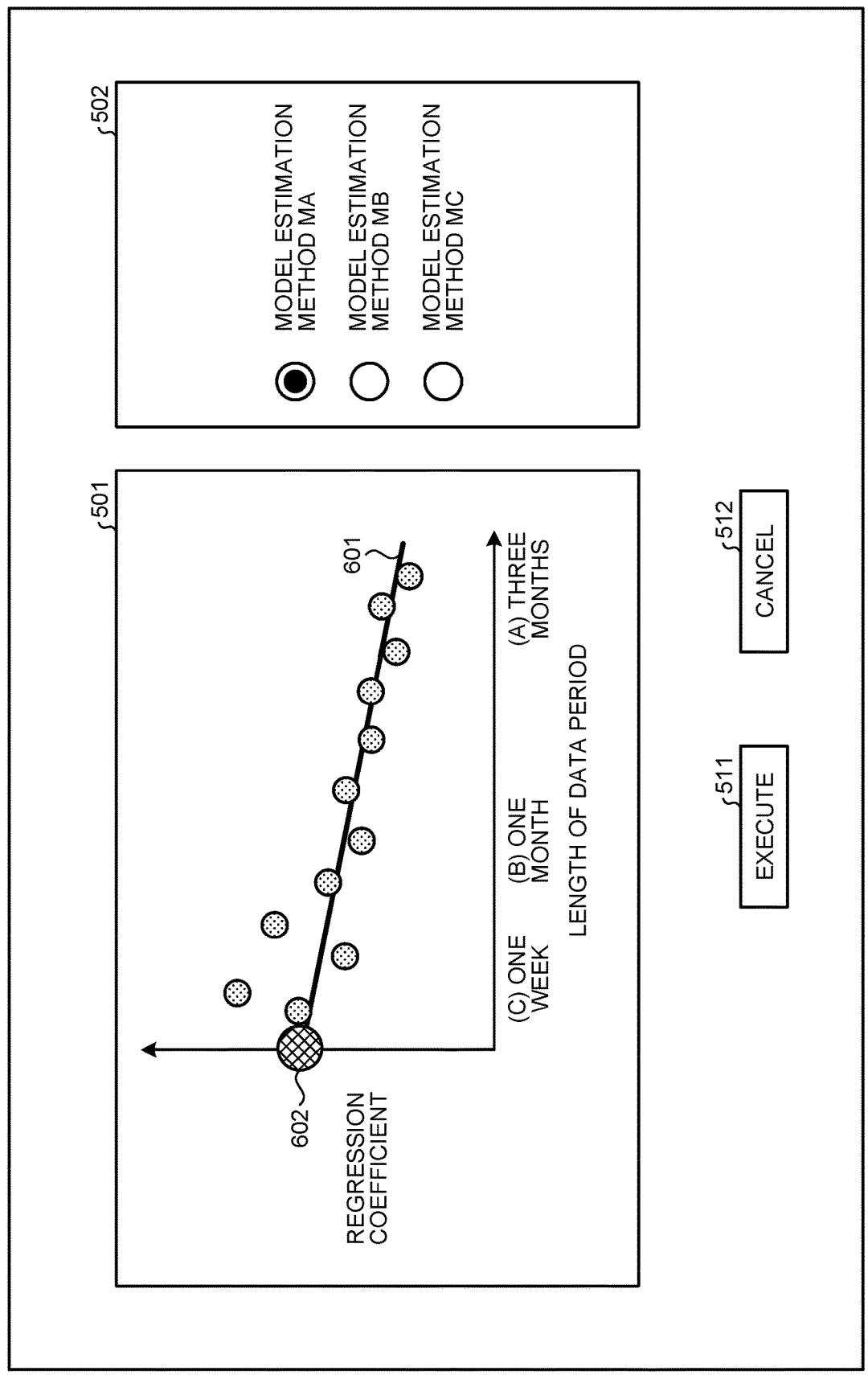
FIG. 6 is a diagram for illustrating an example of the specification screen after the estimation of a model.

FIG. 6 is a diagram for illustrating an example of the specification screen after the estimation of a model. As illustrated in FIG. 6, the specification screen includes a straight line 601 and a regression coefficient 602. The straight line 601 corresponds to the information indicating the model (the second model) estimated from a plurality of regression models. The regression coefficient 602 represents the regression coefficient at the time point T and corresponds to the estimated model (the first model). For example, in the display 123, the output control unit 105 outputs the information indicating the model (the second model) estimated from a plurality of regression models, and outputs the model estimated using the second model.

After the model for estimating the objective variables from the explanatory variables (the first model) is made visual, the user becomes able to select the estimation method to be used in estimating the model corresponding to the specified point of time. As a result, it becomes possible to enhance the understanding of the user, and to improve the flexibility of the system.

Meanwhile, the user-specifiable items are not limited to the model estimation method to be implemented by the model estimating unit 104. For example, the output control unit 105 can be equipped with a function for displaying, in the display 123, a screen for enabling the specification (selection) of the following items.

- the model specification method to be implemented by the model estimating unit 103
- the time period to be used in model estimation by the model estimating unit 103
- the explanatory variables of the model to be estimated In this way, in the first embodiment, it becomes possible to estimate a model that has a higher degree of accuracy and that is capable of performing analysis also with respect to the points of time on which data is insufficient.

Second Embodiment

In a manufacturing device (an example of an electronic device) meant for manufacturing products, maintenance is carried out on a periodic basis. For example, in a semiconductor manufacturing device, since dust gets generated accompanying the manufacturing process, maintenance is carried out on a periodic basis. As a result of carrying out maintenance, the state of the manufacturing device undergoes a change, and thus the regression model too sometimes changes in a significant way. In that regard, in an information processing device according to a second embodiment, the data periods are decided using the maintenance dates, thereby enabling estimation of a more accurate regression model.

Figure 7:
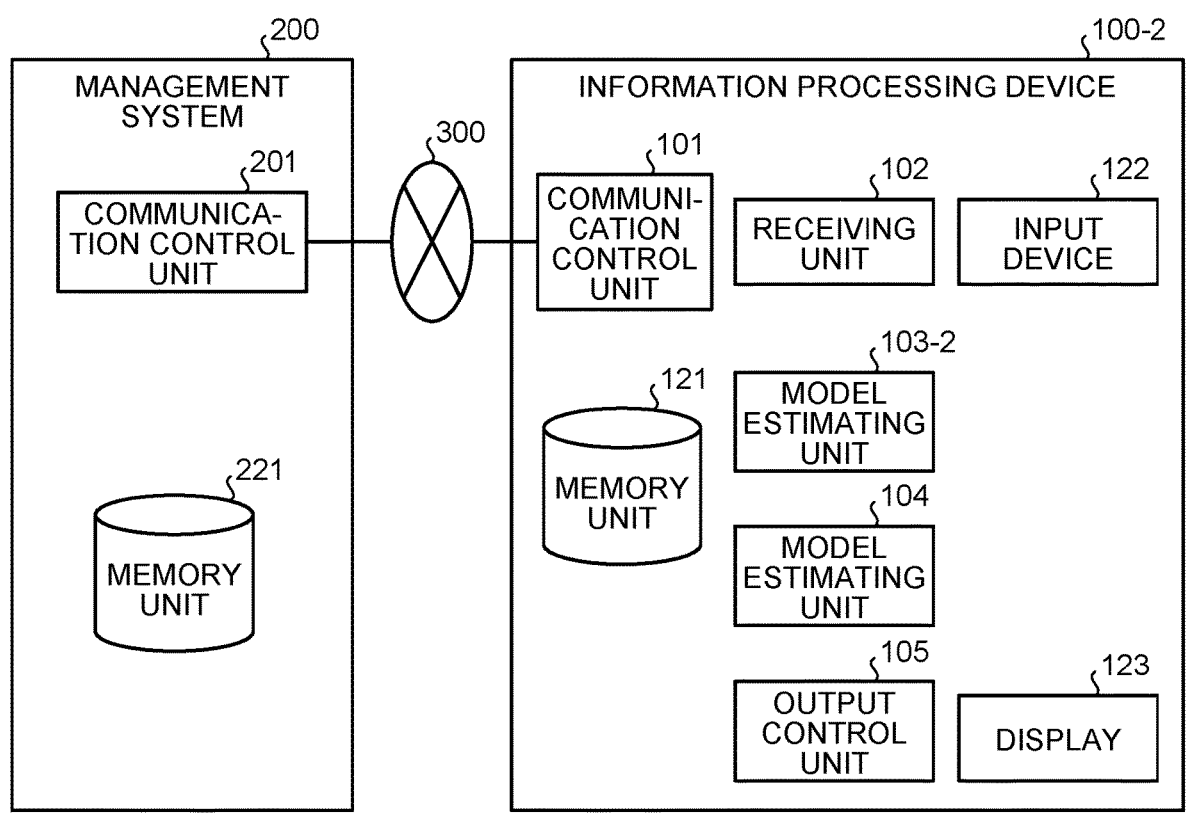
FIG. 7 is a block diagram of an information processing system according to a second embodiment.

FIG. 7 is a block diagram illustrating an exemplary configuration of an information processing system that includes an information processing device 100-2 according to the second embodiment. Herein, the management system 200 and the network 300 are identical to the first embodiment. Hence, they are referred to by the same reference numerals, and their explanation is not given again. As illustrated in FIG. 7, the information processing device 100-2 includes the memory unit 121, the input device 122, the display 123, the communication control unit 101, the receiving unit 102, a model estimating unit 103-2, the model estimating unit 104, and the output control unit 105.

In the second embodiment, the model estimating unit 103-2 has different functions as compared to the first embodiment. The other constituent elements and the functions are identical to FIG. 1 that is the block diagram of the information processing device 100 according to the first embodiment. Hence, those constituent elements are referred to by the same reference numerals, and their explanation is not given again.

As compared to the model estimating unit 103 according to the first embodiment, the model estimating unit 103-2 differs in the way that the data periods are decided by taking into account the maintenance dates. When maintenance is carried out, there occurs a change in the state of the manufacturing device, and a plurality of pieces of input data may change according to the state of the manufacturing device. In that regard, the model estimating unit 103-2 decides on the K data periods based on the maintenance interval.

Given below is the detailed explanation of a model estimation operation performed according to the maintenance interval.

It is assumed that each set $t_i$ of input data indicates a date on which processing is performed in the manufacturing device. Moreover, it is assumed that maintenance is carried out immediately after each I (=i_m$_1$, . . . , i_m$_M$) (i.e., maintenance is carried out for a total of M times). Herein, for explanatory convenience, i_m$_0$=1 and i_m$_{M+1}$=T are assumed to hold true.

The model estimating unit 103-2 decides on (M+1) time periods starting from i_m$_{h-1}$ up to i_m$_h$ (where 1≤h≤M+1 holds true) as the data periods. It can be interpreted that these data periods correspond to the time periods of the maintenance intervals. Then, as given below in Equation (7), the model estimating unit 103-2 estimates (M+1) regression models corresponding to the maintenance intervals.

$$\hat{\beta}_0^{(k)}, \hat{\beta}^{(k)} = \mathrm{argmin}_{\beta_0, \beta} \sum_{i=i_{m_{k-1}}}^{i_{m_k}} (y_i - \beta_0 - \beta^T x_i)^2, k = 1, \ldots, M+1 \quad (7)$$

Herein, $\hat{\beta}^{(M+1)}$ represents the regression model obtained using the input data after the most recent maintenance (performed for the M-th time). It is possible to treat $\hat{\beta}^{(M+1)}$ as regression model for the present. However, if maintenance is carried out on a frequent basis and if the number of elapsed days after maintenance is small, then there is a possibility that the regression model at the current point of time cannot be accurately estimated due to data deficiency.

In that regard, in an identical manner to the first embodiment, using the sets ($\hat{\beta}^{(k)}$, $\hat{\beta}^{(k)}$, t_i$_K$) (where k=1, . . . , M+1 holds true) including the regression models for (M+1) data periods and the time points, a regression model at the current point of time (the time point T) is estimated.

Meanwhile, it can be interpreted that the (M+1) data periods have mutually different time parameters representing the start points (the start time points) or the end points (the end time points). In this example, since there are (M+1) data periods, the K data periods according to the first embodiment can be substituted with the (M+1) data periods, so that it becomes possible to implement the same methods as the first embodiment.

That is, by substituting "K" with "M+1" in Equation (4) given earlier, the model estimating unit 104 can estimate a model indicating the relationship between the time parameter and the (M+1) models.

FIG. 8 is a diagram illustrating the outline of the operation for estimating a regression model according to the second embodiment. On the horizontal axis, the length of a data period corresponds to the length up to the start point of the data period with reference to the current point of time. In FIG. 8 is illustrated an example in which the trend of the input data changed in an intermittent manner due to the maintenance performed one and half months ago. In the second embodiment, a model is estimated using the data periods partitioned by a date on which maintenance was carried out.

In this way, in the second embodiment, instead of simply estimating a single regression model corresponding to each maintenance interval, a plurality of models is estimated for each of a plurality of data periods corresponding to the maintenance intervals; and the changes in the time axis direction of a plurality of models are further modeled. As a result, it becomes possible to estimate a highly accurate regression model by taking into account the intermittent fluctuations attributed to the maintenance.

As explained above, according to the first and second embodiments, it becomes possible to estimate a regression model having a higher degree of accuracy.

Explained below with reference to FIG. 9 is a hardware configuration of the information processing devices according to the first and second embodiments. FIG. 9 is an explanatory diagram for explaining an exemplary hardware configuration of the information processing devices according to the first and second embodiments.

Each of the information processing devices according to the first and second embodiments includes a control device such as a CPU 51; memory devices such as a read only memory (ROM) 52 and a RAM 53; a communication interface (I/F) 54 that establishes connection with a network and performs communication; and a bus 61 that connects the constituent elements to each other.

A computer program executed in each of the information processing devices according to the first and second embodiments is stored in advance in the ROM 52.

Alternatively, the computer program executed in each of the information processing devices according to the first and second embodiments can be recorded as an installable file or an executable file in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer program executed in each of the information processing devices according to the first and second embodiments can be stored in a downloadable manner in a computer connected to a network such as the Internet. Still alternatively, the computer program executed in each of the information processing devices according to the first and second embodiments can be distributed via a network such as the Internet.

The computer program executed in each of the information processing devices according to the first and second embodiments can make a computer function as the constituent elements of that information processing device. In that computer, the CPU 51 can read the computer program from a computer-readable memory medium into the main memory device, and can execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   one or more processors configured to:
   receive input of a plurality of pieces of input data obtained during K time periods, K being an integer equal to or greater than two, the plurality of pieces of input data including one or more explanatory variables and one or more objective variables, the one or more explanatory variables and the one or more objective variables being variables related to a manufacturing process performed by a manufacturing plant that includes a semiconductor factory and a chemical plant;
   create K first models, each of the K first models being a model that receives input of the one or more explanatory variables and outputs the one or more objective variables, each of the K first models being created for a corresponding period among the K time periods, by machine learning using a plurality of pieces of input data obtained during the corresponding period;
   create a second model that receives input of a first time parameter and outputs a parameter of a third model that receives input of the one or more explanatory variables and outputs the one or more objective variables, the second model being created by machine learning using a plurality of parameters of the created K first models; and
   estimate the parameter of the third model by inputting a specified second time parameter to the created second model.

2. The device according to claim 1, wherein the first time parameter indicates at least one of a length of a time period, a start time point of the time period, and an end time point of the time period.

3. The device according to claim 2, wherein the second time parameter indicates a time point arriving after end time points of the K time periods.

4. The device according to claim 1, wherein the one or more processors create the K first models in such a way that parameters of each of the K first models have sparsity.

5. The device according to claim 1, wherein the one or more processors perform transfer learning in which one of the K first models created correspondingly to a first time period is used as an initial value, to create another one of the K first models corresponding to a second time period.

6. The device according to claim 1, wherein lengths of the K time periods are decided based on degrees of accuracy of the K first models.

7. The device according to claim 1, wherein
   the plurality of pieces of input data change according to a state of an electronic device, and
   lengths of the K time periods are decided based on an interval of maintenance carried out in the electronic device.

8. The device according to claim 1, wherein each of the K first models is any one of a linear regression model, a polynomial regression model, a logistic regression model, a Poisson regression model, a generalized liner model, a generalized additive model, and a neural network model.

9. The device according to claim 1, wherein the one or more processors display, on a display device, the K first models, and the third model.

10. The device according to claim 9, wherein
    the second model is a regression model, and
    the one or more processors display information indicating the regression model, on the display device.

11. The device according to claim 1, wherein the K time periods has the first time parameters different from each other.

12. An information processing method implemented in an information processing device, comprising:
    receiving input of a plurality of pieces of input data obtained during K time periods, K being an integer equal to or greater than two, the plurality of pieces of input data including one or more explanatory variables and one or more objective variables, the one or more explanatory variables and the one or more objective variables being variables related to a manufacturing process performed by a manufacturing plant that includes a semiconductor factory and a chemical plant;
    creating K first models, each of the K first models being a model that receives input of the one or more explanatory variables and outputs the one or more objective variables, each of the K first models being created for a corresponding period among the K time periods, by machine learning using a plurality of pieces of input data obtained during the corresponding period;
    creating a second model that receives input of a first time parameter and outputs a parameter of a third model that receives input of the one or more explanatory variables and outputs the one or more objective variables, the second model being created by machine learning using a plurality of parameters of the created K first models; and estimating the parameter of the third model by inputting a specified second time parameter to the created second model.

13. A computer program product comprising a non-transitory computer-readable medium including instructions stored thereon, the instructions causing a computer to execute:

receiving input of a plurality of pieces of input data obtained during K time periods, K being an integer equal to or greater than two, the plurality of pieces of input data including one or more explanatory variables and one or more objective variables, the one or more explanatory variables and the one or more objective variables being variables related to a manufacturing process performed by a manufacturing plant that includes a semiconductor factory and a chemical plant;

creating K first models, each of the K first models being a model that receives input of the one or more explanatory variables and outputs the one or more objective variables, each of the K first models being created for a corresponding period among the K time periods, by machine learning using a plurality of pieces of input data obtained during the corresponding period;

creating a second model that receives input of a first time parameter and outputs a parameter of a third model that receives input of the one or more explanatory variables and outputs the one or more objective variables, the second model being created by machine learning using a plurality of parameters of the created K first models, and estimating the parameter of the third model by inputting a specified second time parameter to the created second model.

* * * * *